Jan. 11, 1938. W. A. BEAUCHAMP Re. 20,616
DOOR LOCK
Original Filed Oct. 11, 1930 2 Sheets-Sheet 1
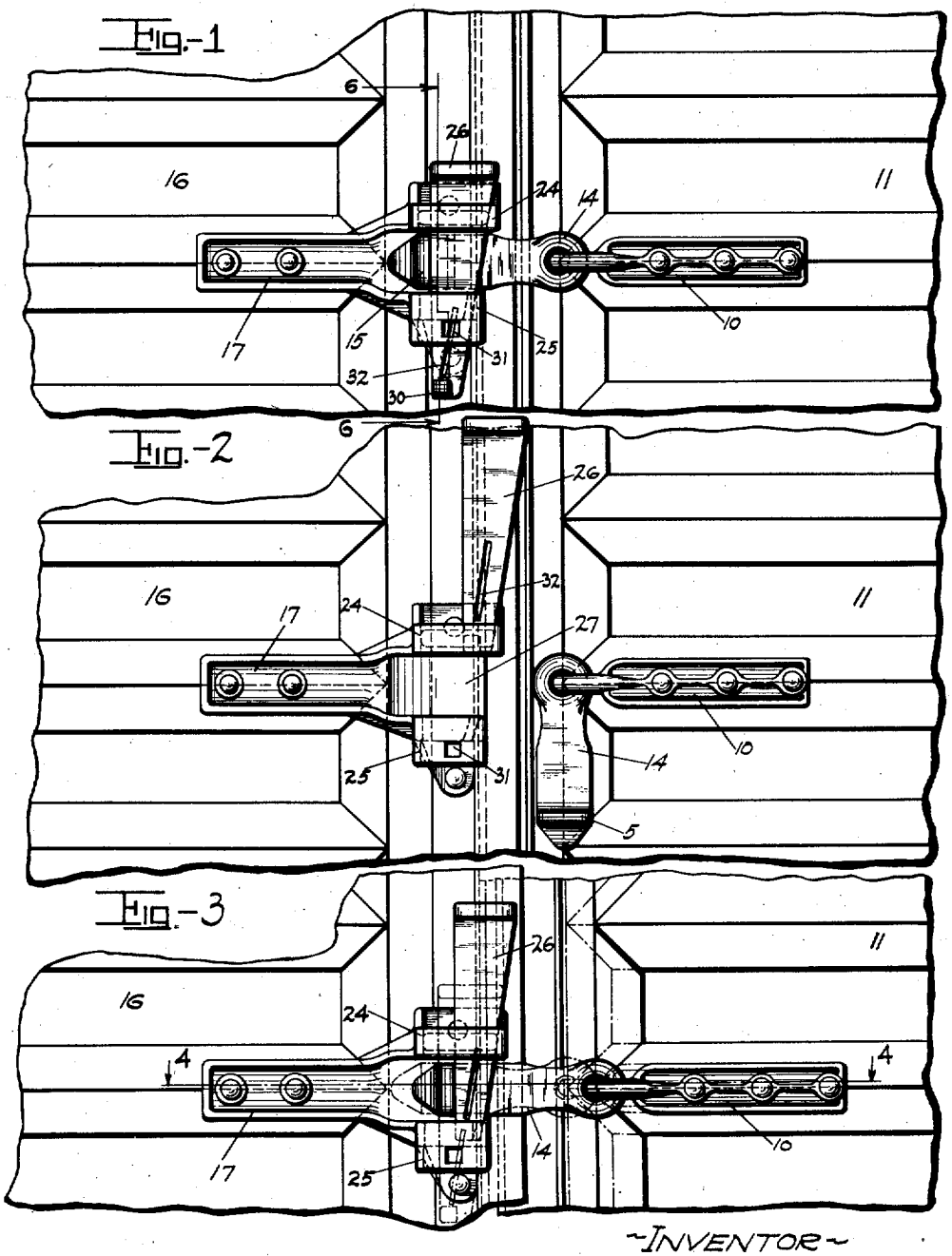
~INVENTOR~
WILFRED A. BEAUCHAMP
BY- Samuel Rosenblatt
ATTY.

Jan. 11, 1938. W. A. BEAUCHAMP Re. 20,616
DOOR LOCK
Original Filed Oct. 11, 1930 2 Sheets-Sheet 2
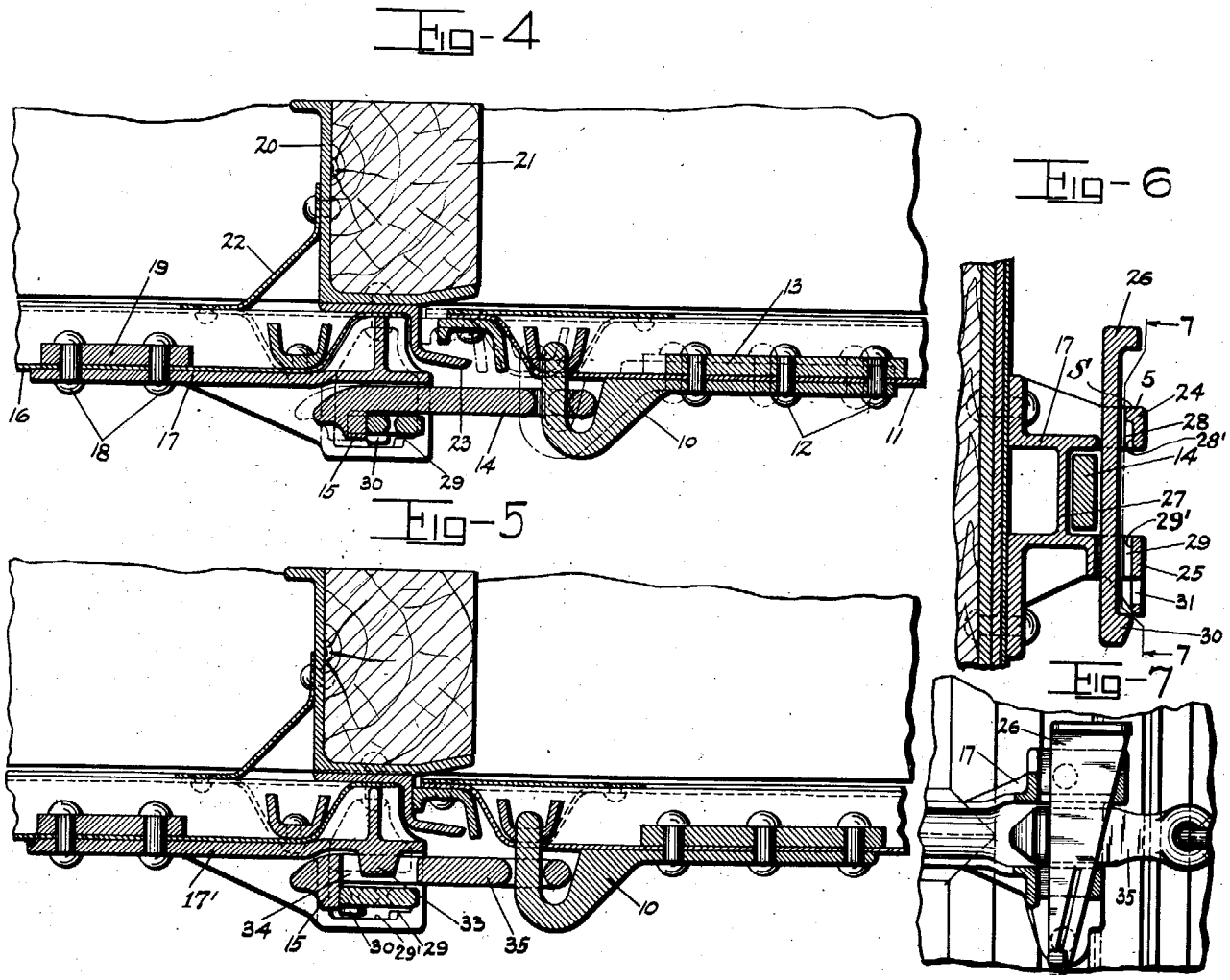
-INVENTOR-
WILFRED A. BEAUCHAMP
By- Samuel Rosenblatt
ATTY.

Reissued Jan. 11, 1938

Re. 20,616

UNITED STATES PATENT OFFICE 20,616

DOOR LOCK

Wilfred A. Beauchamp, Chicago, Ill., assignor, by mesne assignments, to The Youngstown Steel Door Company, Cleveland, Ohio, a corporation of Ohio Original No. 1,877,263, dated September 13, 1932, Serial No. 487,939, October 11, 1930. Application for reissue March 30, 1934, Serial No. 718,193

9 Claims. (Cl. 292—284)

This invention relates to door locks and more particularly to such locks employed in single door or double door house cars.

In the application of the usual lock, hasp and hasp fastener to car doors it is the customary practice to allow a certain tolerance between the staple on the lock and the slot in the hasp through which the staple extends to provide for inaccuracies in application. These inaccuracies present a trying situation and frequently all of the tolerance is absorbed therein so that in use it becomes necessary to hammer the hasp over the staple to effect locking of the doors. Under this condition, as well as under a normal application of the door and lock, movement between the hasp and staple occurs responsive to the movement of the door when the car is in transit. The hasp and staple are, consequently, subjected to an incessant pounding producing considerable stress and wear in these parts and final failure thereof. Concentrated stresses and aggravated wear of the parts of the old door locks result, furthermore, from the relatively small contacting surface upon which such stresses and wear are incident. The use by the railroads, moreover, of more rigid door and car constructions presents a situation where the stresses above mentioned must be carried by the various elements of the lock mechanism and cannot be absorbed by the door or car.

It is an object of this invention to provide a door lock which will negative within the limits of the lock the effects of the discrepancies of application. In the accomplishment of this object the lock is so constructed that any tolerance or slack of the parts is automatically absorbed.

An object, furthermore, is the provision of increased area of bearing surface between the lock parts so as to avoid a concentration of stresses and to effect a reduction of wear.

A further object is the provision of a door lock in which direct bearing between the pin and the hasp is effected, the pin being responsive to the movement of the hasp to restore bearing therewith in the event of movement of the door.

It is an object, as well, to provide a door lock comprising a lock plate and a hasp of novel construction and interchangeable with the customary lock plate and hasp.

Other objects of the invention as well as advantages thereof will become apparent as the specification proceeds, the invention being illustrated in the accompanying drawings forming a part of said specification.

In said drawings:—

Figure 1 is a fragmentary elevation showing the lock of the invention applied to a double door construction, the lock being shown in operative position;

Figure 2 is a view similar to Figure 1, showing the lock in inoperative position;

Figure 3 is a view similar to Figure 1, illustrating in dot and dash lines the mode of operation of the lock;

Figure 4 is a sectional view taken substantially on line 4—4 of Figure 3;

Figure 5 is a view similar to Figure 4 showing a modified lock construction;

Figure 6 is a sectional view taken substantially on lines 6—6 of Figure 1; and

Figure 7 is a sectional view taken substantially on line 7—7 of Figure 6.

The lock structure of the invention is shown applied in the embodiments illustrated, to a double door car construction. It is evident, however, that the lock is not limited to this particular application but that it may as readily be utilized in connection with a single door car construction.

In the application disclosed, the hasp fastener 10 is secured to the main door 11 of a double door construction, by means of rivets 12 extending through the hasp fastener, the door and the backing plate 13. The door 11 is illustrated as a corrugated metallic door, although it is evident that the lock may be applied to any type of door. Carried by the hasp fastener in the usual manner is a hasp 14 provided adjacent its free end with a lug 15, the function of which is hereinafter set forth.

Secured to the customarily termed "auxiliary" door 16 of the double door construction is a lock member 17. This securement is effected by means of rivets 18 extending through the lock member, the door and the backing plate 19. The construction of the auxiliary door illustrated forms no part of the invention and comprises the usual metallic jamb 20 provided with a wood filler 21, said jamb being rigidly secured to the door and braced thereagainst by means of knee braces 22. The forward edge of the auxiliary door is also provided with an angle member 23 affording, together with a portion of the metallic jamb, an opening for the reception of the front edge of the main door.

The lock member of the lock construction is provided with two vertically spaced housing portions, 24 and 25, adapted to receive a fastening pin 26. The portion of the lock member between the two housings is plane as indicated at 27, and is adapted to receive the hasp when the latter is in operative position. Each of the housings 24 and 25 is provided adjacent one corner thereof with projections 28 and 29, these projections defining corresponding recesses 28′ and 29′, respectively. The recess 29′ formed in the lower housing 25 extends for the depth of the housing as indicated in Figure 6 of the drawings. The recess 28′, as clearly illustrated in Figure 6, extends from the bottom of housing 24 to a point below the top of said housing and thus provides a shoulder S for a purpose hereinafter described when the latter has been secured in position. The provision of the recesses 28′ and 29′ permits the formation of a lug 30 on the lower end of the fastening pin 26 while preventing inadvertent hooking of said lug on the lower portion of the housings in the retracting movement of said pin. Moreover, the recess in the upper housing enables the pin, in its substantially retracted position, to assume an inclination toward the door to sustain the pin in said position. Complete disengagement of the pin from the upper housing in the operative position of the lock plate 17 is avoided by the shoulder S. The projections 28 and 29 serve to limit lateral displacement of the pin in its vertical movement. The lower housing 25 is provided with an opening 31, adapted to coact with an inclined slot 32 formed in the lower portion of the pin to receive a sealing ribbon for sealing the door.

The pin 26 is provided with one inclined edge, the opposite edge of said pin being straight and forming an abutment for the lug 15 of the hasp when the hasp and pin are in their operative positions. It is noted that the inclined edge of the pin in its operative position is in engagement with similarly inclined portions of said housings. It is evident that by such an arrangement the stresses upon the lock are distributed over a large area.

The operation of the lock structure is clearly illustrated in Figures 3 and 4 of the drawings, and taken together with the description of the parts thereof such operation will become readily apparent. Assuming that the door could be closed only as far as is indicated by the full line positions in Figures 3 and 4, it is evident that the hasp could be positioned properly and in locking engagement with the pin, which in turn is seated within the housings of the lock member. During the movement of the car a corresponding movement may be imparted to the door, whereupon said door will take the position indicated in dot and dash lines in Figures 3 and 4. It is clear from the drawings that, should the door remain at all times in the full line position shown, the hasp will bear tightly against the pin and all relative movement between the pin and hasp will be avoided. However, in the event that the door moves from the full line position to the position indicated by the dot and dash lines it is evident that the hasp will have imparted to it a corresponding movement. The pin is thereupon released from the restraining influence of the hasp and, due to the inclined edge thereof, will readily be lowered by the action of gravity until the contacting relationship between the lug on the hasp and the pin is again obtained. In this position, as well as in the former position, it is evident that no play between the hasp and the pin is permitted. It is obvious, therefore, that with the elimination of the relative movement or play between the hasp and the pin all pounding between these parts is avoided.

In the embodiment of the invention shown in Figures 1 to 4, inclusive, and Figure 6, the hasp is illustrated as being solid. In the modification illustrated in Figure 5 of the drawings, however, the lock member 17′ is provided with a laterally extending lug 33, adapted to be positioned within a slot 34, provided in the hasp 35. As shown in Figure 5, considerable clearance is provided between the lug and the walls of the slot and the lug terminates within the slot. In this construction as well as that shown in the previous embodiment of the invention, a tapered pin is employed and the function and advantages of said first embodiment are maintained. In addition thereto, the modified construction of Figure 5 permits interchangeability where a latch of the construction shown is not available, by the use of the old style hasp. In such a hasp, of course, the lug 15 is not provided, and while the pin and lock member shown may be utilized with such old style hasp it must be borne in mind that the cooperation between the tapered pin and the hasp provided with a lug is not obtained. However, the construction permitting the use of the old type hasp is effective and desirable for interchangeability, inasmuch as it avoids undesirable bad ordering of the car and retention of the car in uninterrupted service. It is apparent, furthermore, that the hasp 35 and the tapered fastening pin 26 may be utilized with the usual lock member which embodies the customary lug provided with an opening through which the pin is adapted to extend. With this usual lock member the tolerance between the hasp and staple may not be absorbed but complete interchangeability is obtained for the purpose set out above.

Many modifications and changes in the structural details of the invention set forth may obviously be made without departing from the spirit of the invention. All such modifications and changes are deemed to be comprehended in the invention which is to be limited only by the scope of the claims appended hereto.

I claim:

1. In a door lock, in combination, a hasp, a hasp fastener therefor, a lock member provided with a pair of spaced housings each of said housings being provided with an inclined side and a pin extending through said housings and provided with one straight side and one inclined side, said hasp in operative position lying between said housings and having abutting engagement with the straight side of said pin, the inclined side of said pin bearing against the inclined sides of said housings.

2. In a door lock, in combination, a hasp fastener, a hasp, said hasp being supported by said fastener, a lock member, a pin, said member supporting said pin for relative substantially vertical movement and a lug provided on said hasp and having abutting relation with said pin to determine the position of the latter, said pin being capable of automatic movement to re-establish said abutting relation with the lug when such relationship is broken by movement of said hasp.

3. In a door lock, in combination, a hasp, a hasp fastener therefor, a lock member provided with a housing, said housing having a laterally extending projection providing a recess and a pin extending through said housing, said pin being provided adjacent the lower edge thereof with a lateral extension positioned substantially in alignment with said recess.

4. In a house car, a door, a relatively fixed member supported on said car, a hasp fastener secured to said door, a hasp supported by said fastener, a lock member secured to said relatively fixed car member, said lock member being provided with a pair of spaced housings and a tapered vertically movable pin extending through said housings, said hasp being provided with a lug, said lug and a portion of said housings defining an opening for the reception of said pin, said opening being variable and controlled by movement of said hasp, said pin moving downwardly automatically in response to the movement of the hasp.

5. In a railway house car having a relatively stationary member and a slidable door member, a substantially vertically reciprocable latching element, means secured to one of said members for carrying said element, an abutment for said element secured to the other of said members, the adjacent sides of said means and element remote from said abutment being inclined toward said abutment, said latching element adapted to have engagement with said abutment when said door member is moved in one direction to prevent movement of said door member in the opposite direction, said engagement between said element and said abutment determining the position of said latching element, said element being biased downwardly by the action of gravity to reestablish engagement with said abutment when said engagement is broken, whereby separation between said element and said abutment resulting from relative sliding movement between said members is automatically absorbed.

6. In a railway house car having a stationary member and a slidable door member, at least one housing secured to one of said members, a substantially vertically reciprocable latching element disposed in said housing, an abutment for said latching element secured to the other of said members, the side of said element remote from said abutment being inclined downwardly toward said abutment and cooperating with said housing whereby to urge said element toward said abutment, said latching element adapted to have engagement with said abutment when said door member is moved in one direction to prevent movement of said door member in the opposite direction, said engagement between said element and said abutment determining the position of said latching element, said element being biased downwardly by the action of gravity to reestablish engagement with said abutment when said engagement is broken, whereby separation between said element and said abutment resulting from relative sliding movement between said members is automatically absorbed.

7. In a railway house car having a relatively stationary member and a slidable door member, a bracket secured to one of said members, vertically reciprocable means carried by said bracket, an abutment for said means secured to the other of said members, adjacent sides of said bracket and said means being similarly inclined, said means being engageable with said abutment prior to the full closed position of said door member to prevent opening movement thereof, said engagement between said means and said abutment determining the position of said means, said means being biased downwardly by the action of gravity and reestablishing engagement with said abutment as said door member moves toward fully closed position, thereby preventing movement of said door member in the opposite direction, whereby tolerance or slack which may occur between said means and said abutment upon relative movement between said members is automatically absorbed.

8. In a railway house car having a relatively stationary member and a slidable door member, a vertically reciprocable pin having downwardly converging sides secured to one of said members, an abutment for said pin secured to the other of said members, said pin being engageable with said abutment prior to the full closed position of said door member to prevent opening movement thereof, said engagement between said pin and abutment determining the position of said pin, said pin being biased downwardly by the action of gravity and reestablishing engagement with said abutment as said door member moves toward fully closed position, thereby preventing movement of said door in the opposite direction, means provided on one of said members adapted to receive a device for indicating unauthorized opening of said door member, said door member being movable toward closed position and said pin being movable downwardly for engagement with said abutment in response to such door movement subsequent to the engagement of the indicating device with said receiving means.

9. In a railway house car having a relatively stationary member and a slidable door member, a vertically reciprocable pin secured to one of said members, an abutment for said pin secured to the other of said members, said pin being engageable with said abutment prior to the full closed position of said door member to prevent opening movement thereof, said engagement between said pin and abutment determining the position of said pin, said pin being biased downwardly by the action of gravity, said pin during downward movement reestablishing engagement with said abutment as said door moved toward fully closed position, thereby preventing movement of said door in the opposite direction, means secured to one of said members to enable said door to be sealed, said pin being movable downwardly in the sealed position of said door member to automatically absorb slack introduced by the movement of said door member toward closed position.

WILFRED A. BEAUCHAMP.